US012673579B2

(12) United States Patent
Raymond, III et al.

(10) Patent No.: US 12,673,579 B2
(45) Date of Patent: Jul. 7, 2026

(54) HIGH VOLTAGE BATTERY TEMPERATURE PERFORMANCE PAGES

(71) Applicant: FCA US LLC, Auburn Hills, MI (US)

(72) Inventors: Victor F Raymond, III, Lake Orion, MI (US); Alexander Rivera, Rochester Hills, MI (US); Daniel Studt, Northville, MI (US); Kirk Hansen, Hazel Park, MI (US)

(73) Assignee: FCA US LLC, Auburn Hills, MI (US)

( * ) Notice: Subject to any disclaimer, the term of this patent is extended or adjusted under 35 U.S.C. 154(b) by 120 days.

(21) Appl. No.: 18/649,127

(22) Filed: Apr. 29, 2024

(65) Prior Publication Data

US 2025/0332955 A1     Oct. 30, 2025

(51) Int. Cl.
B60L 58/10     (2019.01)
H01M 10/48     (2006.01)

(52) U.S. Cl.
CPC ........... B60L 58/10 (2019.02); H01M 10/486 (2013.01); H01M 10/488 (2013.01); B60L 2250/16 (2013.01); H01M 2220/20 (2013.01)

(58) Field of Classification Search
CPC .. B60L 58/10; B60L 2250/16; H01M 10/486; H01M 10/488; H01M 2220/20
See application file for complete search history.

(56) References Cited

U.S. PATENT DOCUMENTS

| | | | | | |
|---|---|---|---|---|---|
| 5,561,362 | A | * | 10/1996 | Kawamura ........ | G01R 31/3842 324/427 |
| 6,008,652 | A | * | 12/1999 | Theofanopoulos ... | H01M 10/48 340/636.15 |
| 6,483,272 | B1 | * | 11/2002 | Terada ...................... | H02J 5/00 320/103 |
| 8,616,457 | B2 | * | 12/2013 | Krawczewicz ..... | H01M 10/488 235/492 |
| 11,085,966 | B2 | * | 8/2021 | Tsutsumi ............ | H01M 10/443 |
| 2012/0029852 | A1 | * | 2/2012 | Goff ...................... | G01R 31/371 702/63 |
| 2016/0077159 | A1 | * | 3/2016 | Petrucelli ............... | G01R 1/025 324/426 |
| 2018/0188332 | A1 | * | 7/2018 | Newman ................ | B60K 35/10 |
| 2019/0036178 | A1 | * | 1/2019 | Karner .................. | H01M 10/48 |
| 2019/0293721 | A1 | * | 9/2019 | Tsutsumi ............. | G01R 31/382 |
| 2019/0296407 | A1 | * | 9/2019 | Newman ........... | H01M 10/6555 |
| 2023/0360451 | A1 | * | 11/2023 | Riley ...................... | B60L 58/16 |

FOREIGN PATENT DOCUMENTS

| | | | | | |
|---|---|---|---|---|---|
| WO | WO-2013089488 | A1 | * | 6/2013 | ............... H02J 7/00 |

* cited by examiner

*Primary Examiner* — Calvin Cheung
(74) *Attorney, Agent, or Firm* — Jeremy J. Klobucar

(57)     ABSTRACT

A vehicle system that communicates temperature information of a high voltage battery system of an electrified vehicle includes at least one temperature sensor, a controller, and a human machine interface (HMI). The at least one temperature sensor is disposed on at least one battery module of the high voltage battery system. The at least one temperature sensor is configured to sense a temperature of the at least one battery module. The controller receives the sensed temperature and determines a temperature profile of the high voltage battery system. The HMI is configured to convey temperature information of the high voltage battery system, wherein the controller communicates a signal to the HMI indicative of the temperature profile.

11 Claims, 4 Drawing Sheets

HIGH VOLTAGE BATTERY TEMPERATURE PERFORMANCE PAGES

FIELD

The present application generally relates to electrified vehicles and, more particularly, to a system and method that displays temperature information related to the high voltage battery pack on a human machine interface in the vehicle.

BACKGROUND

An electrified vehicle (hybrid electric, plug-in hybrid electric, range-extended electric, battery electric, etc.) includes at least one battery system and at least one electric motor. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor.

Electrified vehicles generally include a powertrain configured to generate and transfer drive torque to a driveline of the vehicle for propulsion. The electrified powertrain generally comprises the high voltage battery system, one or more electric motors, and a transmission. The high voltage battery system generally includes a battery pack assembly that includes battery cells arranged in modules. Typically, the battery pack assembly includes a cooling system wherein a cooling liquid is circulated along a cooling plate for cooling the modules and the battery pack assembly. In general, the performance of the high voltage battery system is related to temperature. For example, when portions or all of the high voltage battery system has a high temperature, performance can be negatively impacted. Such temperature information related to the high voltage battery is generally not conveyed to the driver. As such, the driver may not know if the powertrain is at a temperature state that is optimized for a given situation. Accordingly, while such electrified vehicles do work well for their intended purpose, there exists an opportunity for improvement in the relevant art.

SUMMARY

According to one example aspect of the invention, a vehicle system that communicates temperature information of a high voltage battery system of an electrified vehicle includes at least one temperature sensor, a controller, and a human machine interface (HMI). The at least one temperature sensor is disposed on at least one battery module of the high voltage battery system. The at least one temperature sensor is configured to sense a temperature of the at least one battery module. The controller receives the sensed temperature and determines a temperature profile of the high voltage battery system. The HMI is configured to convey temperature information of the high voltage battery system, wherein the controller communicates a signal to the HMI indicative of the temperature profile.

In some implementations, the at least one temperature sensor comprises a first temperature sensor and a second temperature sensor, wherein the at least one battery module comprises a first battery module and a second battery module, wherein the first temperature sensor is disposed in the first battery module and the second temperature sensor is disposed in the second battery module.

In some implementations the at least one temperature sensor comprises ten temperature sensors, wherein a temperature sensor of the ten temperature sensors is disposed in a corresponding battery module of the at least one battery module.

In additional arrangements, the temperature information comprises a first area indicative of a high temperature.

According to another example aspect of the invention, the temperature information comprises a second area indicative of a first moderate temperature.

In some implementations, the temperature information comprises a third area indicative of a second moderate temperature.

In some implementations, the temperature information comprises a fourth area indicative of a low temperature.

In additional arrangements, the HMI displays a temperature gradient of the high voltage battery system based on at least the first and second temperature sensors.

In other configurations, the HMI further displays an efficiency factor corresponding to the temperature profile.

According to another example of the present disclosure, a method for displaying temperature information of a high voltage battery system of an electrified vehicle is provided. The method includes: sensing, with a first temperature sensor disposed on a first battery module, a first temperature of the first battery module; sensing, with a second temperature sensor disposed on a second battery module, a second temperature of the second battery module; receiving, at a controller, the first and second temperatures; determining, at the controller, a temperature profile of the high voltage battery system based on the first and second temperatures; communicating, from the controller, to a human machine interface (HMI) the temperature profile; and displaying, at the HMI, the temperature profile.

In additional arrangements, the temperature information comprises a first area indicative of a high temperature.

According to another example aspect of the invention, the temperature information comprises a second area indicative of a first moderate temperature.

In some implementations, the temperature information comprises a third area indicative of a second moderate temperature.

In some implementations, the temperature information comprises a fourth area indicative of a low temperature.

In additional arrangements, the HMI displays a temperature gradient of the high voltage battery system based on at least the first and second temperature sensors.

In other configurations, the HMI further displays an efficiency factor corresponding to the temperature profile.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, electrified vehicles include a powertrain configured to generate and transfer drive torque to a driveline of the vehicle for propulsion. The electrified powertrain includes a high voltage battery system, one or more electric motors, and a transmission. In general, the performance of the high voltage battery system is related to temperature. For example, when portions or all of the high voltage battery system has a high temperature, performance can be negatively impacted. Such temperature information related to the high voltage battery is generally not conveyed to the driver. As such, the driver may not know if the powertrain is at a temperature state that is optimized for a given situation.

Accordingly, the instant application provides a system and method that senses temperatures at the high voltage battery system and communicates a signal to a human machine interface (HMI) to display the sensed temperatures. In examples, the HMI can display a heat map or gradient of temperatures representative of various temperatures throughout the high voltage battery system.

Figure 1:
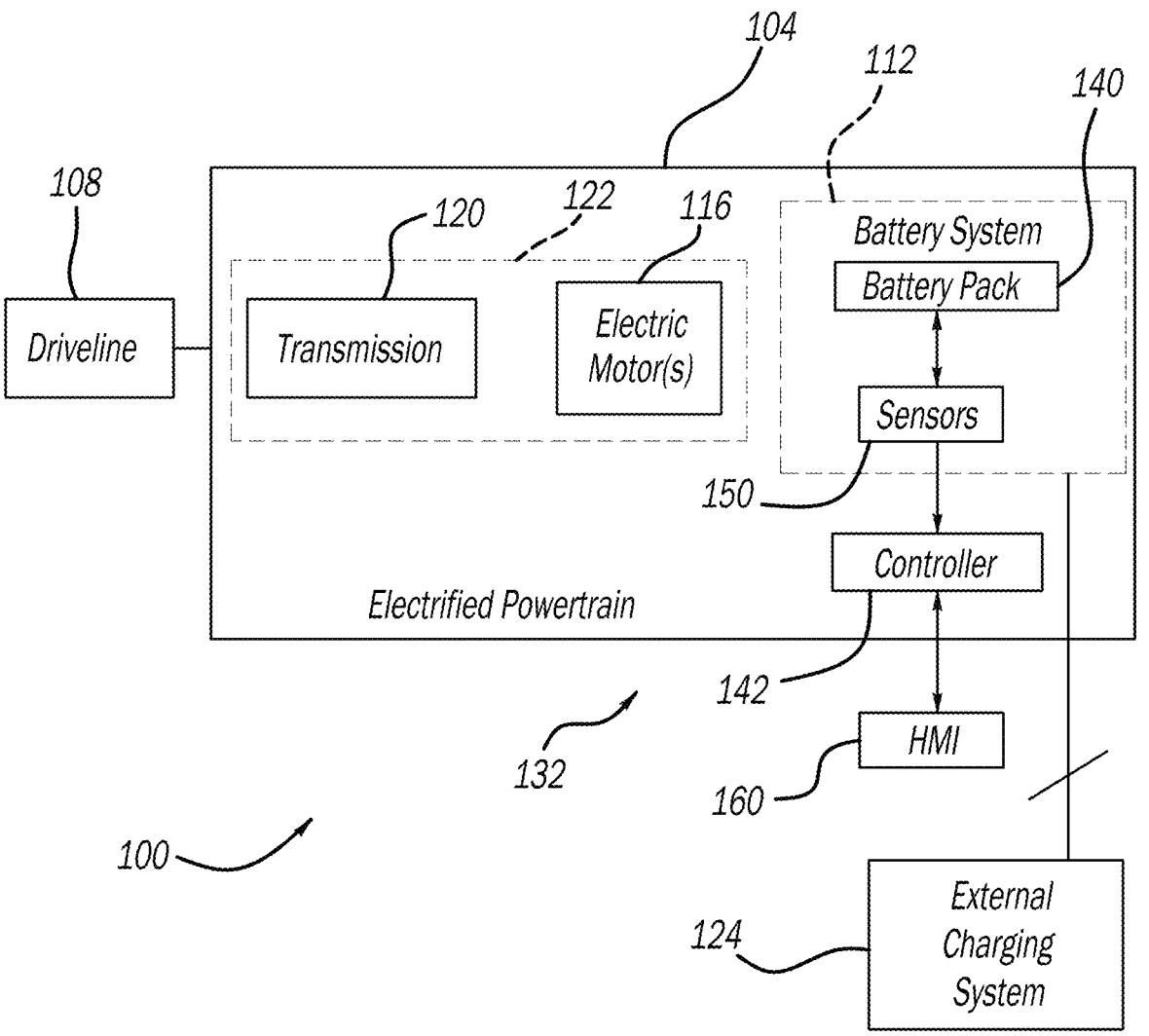
FIG. 1 is a functional block diagram of an electrified vehicle having an electric drive module and high voltage battery system according to the principles of the present application.
Figure 2:
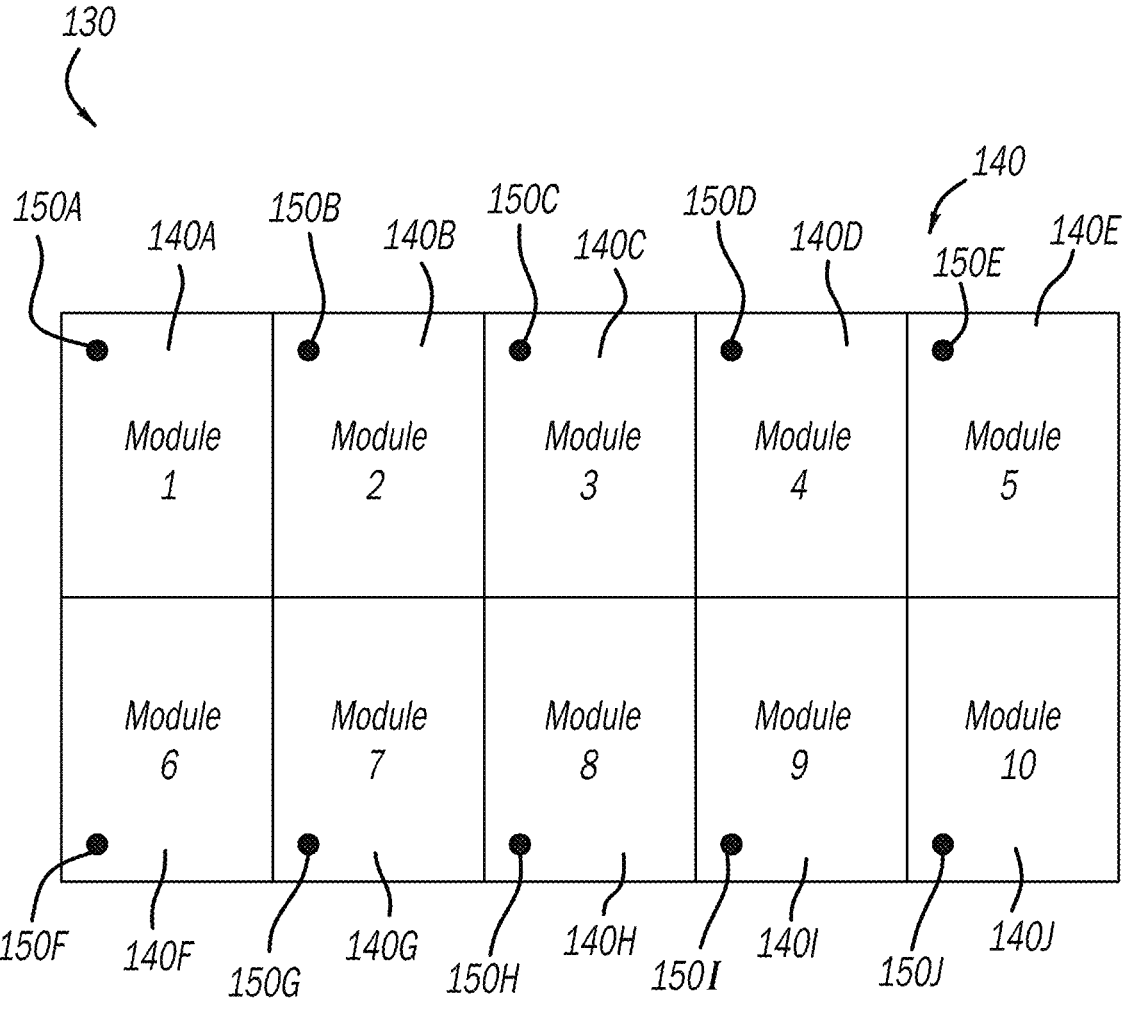
FIG. 2 is an exemplary schematic representation of a battery pack assembly of the high voltage battery system of FIG. 1 according to features of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 configured to generate and transfer drive torque to a driveline 108 of the vehicle 100 for propulsion. The electrified powertrain 104 generally comprises a high voltage battery system 112 (also referred to herein as "battery system 112"), one or more electric motors 116, and a transmission 120. The one or more electric motors 116 and the transmission 120 can be collectively referred to herein as an electric drive module 122. The battery system 112 is selectively connectable (e.g., by the driver) to an external charging system 124 (also referred to herein as "charger 124") for charging of the battery system 112.

The present disclosure provides a vehicle system 132 that senses temperatures of the battery system 112 and communicates a signal to a human machine interface (HMI) to display the sensed temperatures to the driver. The battery system 112 includes a battery pack assembly 140 made up of individual battery modules 140A, 140B, 140C, 140D, 140E, 140F, 140G, 140H, 140I, 140J. Sensors, collectively identified at 150, communicate signals to the controller 142 based on operating conditions sensed at the battery pack assembly 140. In the example shown, the sensors 150 include multiple temperature sensors, individually identified at 150A-150J. Each battery module 140A-140J includes at least one sensor 150A-150J. It will be appreciated that while the exemplary battery pack assembly 140 is shown with ten modules, that more or less modules may be incorporated within the battery pack assembly 140.

Furthermore, while one temperature sensor 150 is shown dedicated to each module 140, additional or fewer temperature sensors 150 may be incorporated throughout the battery pack assembly 140. The controller 142 is configured to communicate signals to an HMI 160 that displays temperature information related to the high voltage battery system 112. It is contemplated that the HMI 160 can include an infotainment system, cluster or other display that conveys temperature information to the driver.

Figure 3:
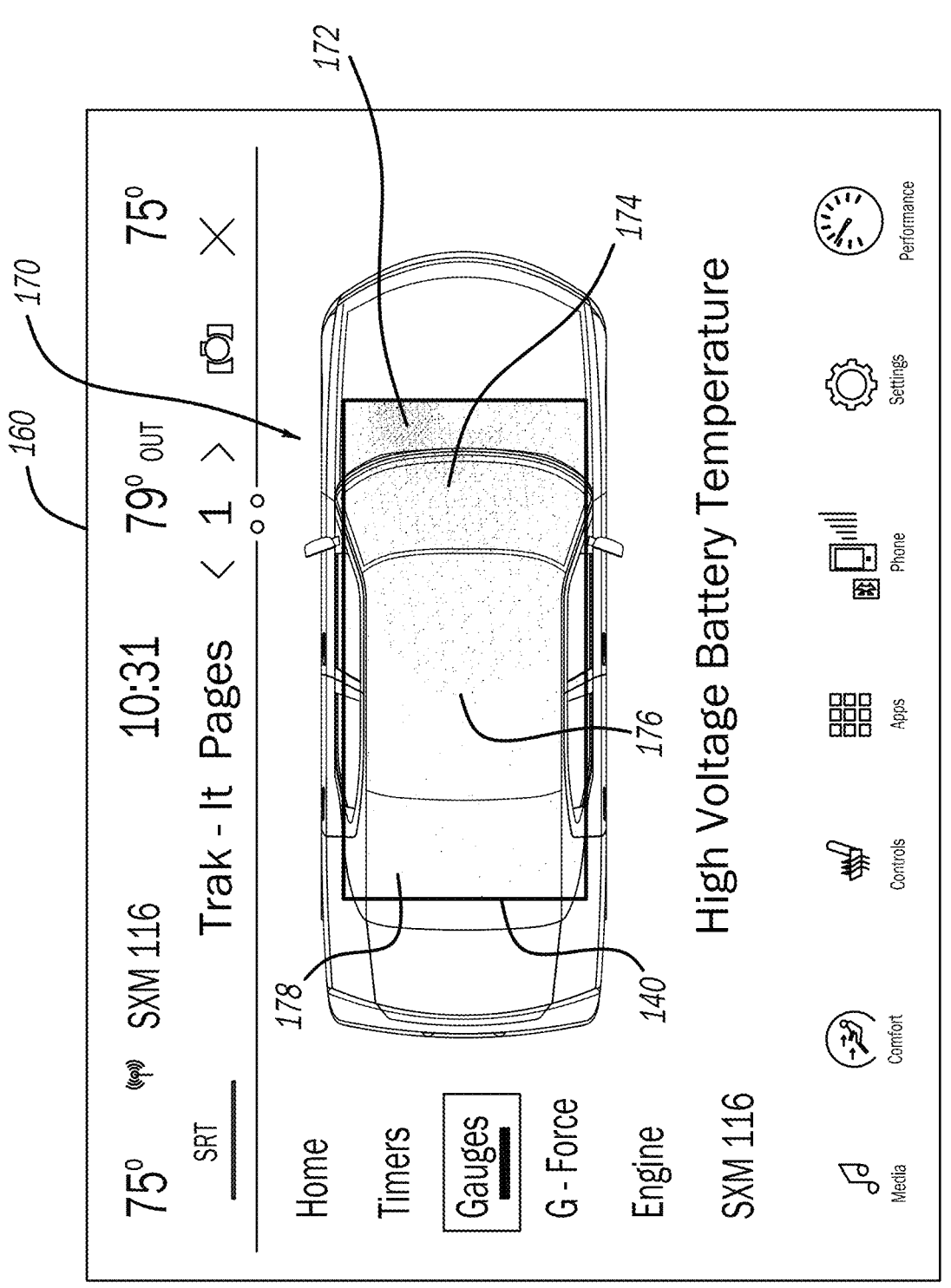
FIG. 3 is an exemplary human machine interface (HMI) that displays temperature information related to the high voltage battery system of FIG. 1.
Figure 4:
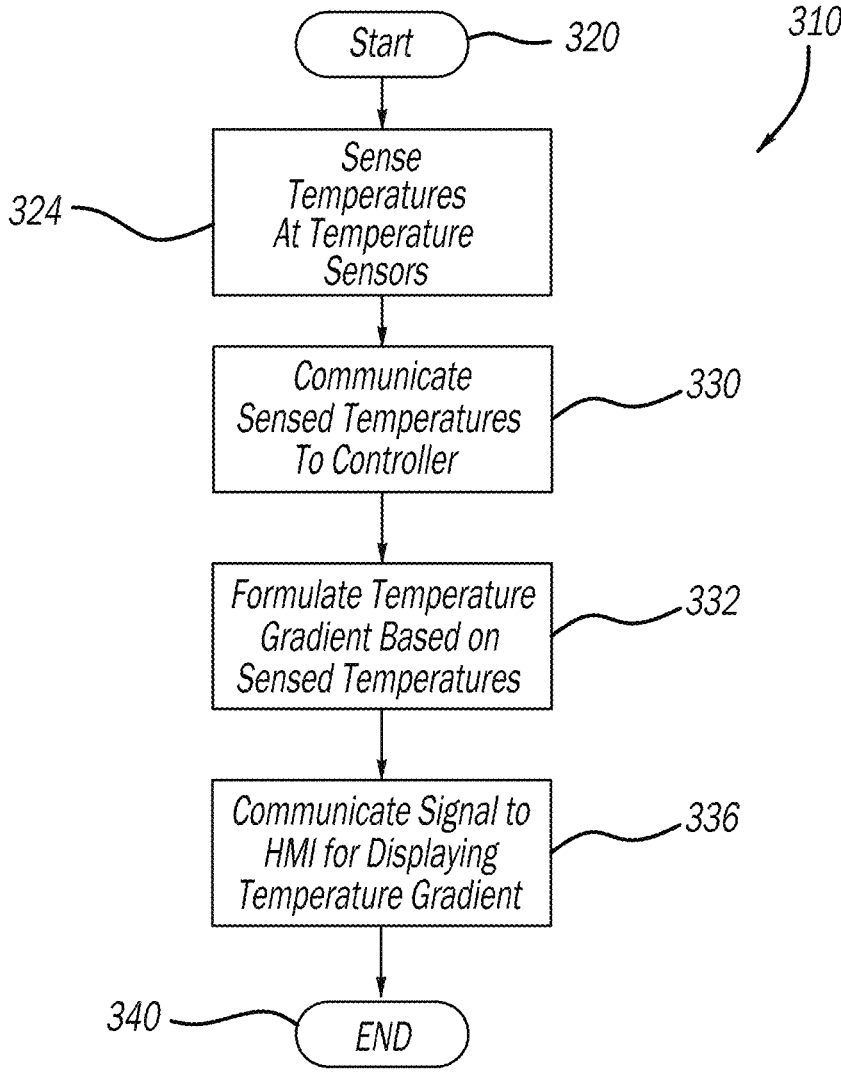
FIG. 4 is an exemplary control method that senses temperatures at the high voltage battery system of FIG. 1 and communicates a signal to the HMI to display the sensed temperatures according to examples of the present application.

With additional reference now to FIG. 3, an exemplary HMI 160 is shown that displays the sensed temperatures 170 throughout the battery pack assembly 140. In the example shown, the sensed temperatures 170 are generally illustrated as a temperature gradient where some areas of the battery pack assembly 140 have higher temperatures compared to other areas. By way of example only, the sensed temperatures 170 include a first area 172 indicative of a high temperature, a second area 174 indicative of first moderate temperature, a third area 176 indicative of a second moderate temperature, and a fourth area 178 indicative of a low temperature.

In examples, the controller 142 can make calculations based on the temperatures received from the temperature sensors 150. In this regard, the controller 142 can deduce a temperature gradient with a generally higher resolution based on single temperature readings (in this example ten) throughout the battery pack assembly 140. Other strategies can be employed for creating a temperature gradient that represents temperature throughout the battery pack assembly 140. In some examples, the HMI 160 can additionally supply an efficiency factor corresponding to the sensed temperatures 170. In this regard, an efficiency factor less than 100% would indicate that at least some of the battery modules 140 have a temperature that exceeds a threshold indicative of a high temperature.

With additional reference to FIG. 3, an exemplary control method 310 that senses temperatures at the high voltage battery system 112 and communicates a signal to the HMI 160 to display the sensed temperatures according to examples of the present application is shown. The method 310 starts at 320. At 324, control senses temperatures at the temperature sensors 150A-150J. At 330, the sensed temperatures from the temperature sensors 150A-150J are communicated to the controller 142. At 332 control formulates a temperature gradient based on the sensed temperatures. At 336, control communicates a signal to the HMI 160 for displaying the temperature gradient. Control ends at 340.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle system that communicates temperature information of a high voltage battery system of an electrified vehicle, the system comprising:
  one or more temperature sensors disposed on one or more battery modules of the high voltage battery system, the one or more temperature sensors configured to sense a temperature of the one or more battery modules, wherein the one or more temperature sensors comprises a first temperature sensor and a second temperature sensor, wherein the one or more battery modules comprises a first battery module and a second battery module, wherein the first temperature sensor is disposed in the first battery module and the second temperature sensor is disposed in the second battery module;
  a controller that receives the sensed temperatures and that determines a temperature profile of the high voltage battery system based on the sensed temperatures, the controller communicating a signal to the HMI indicative of the temperature profile; and
  a human machine interface (HMI) provided on the electrified vehicle that receives the signal and that graphically displays a temperature gradient and an efficiency factor of the high voltage battery system based on the first and second sensed temperatures, wherein an efficiency factor less than 100% indicates that at least some of the one or more battery modules have a temperature that exceeds a threshold indicative of high temperature and negatively impacted performance.

2. The vehicle system of claim 1, wherein the one or more temperature sensors comprises ten temperature sensors, wherein a temperature sensor of the ten temperature sensors is disposed in a corresponding battery module of the one or more battery module.

3. The vehicle system of claim 1, wherein the temperature information comprises a first area indicative of a high temperature.

4. The vehicle system of claim 3, wherein the temperature information comprises a second area indicative of a first moderate temperature.

5. The vehicle system of claim 4, wherein the temperature information comprises a third area indicative of a second moderate temperature.

6. The vehicle system of claim 5, wherein the temperature information comprises a fourth area indicative of a low temperature.

7. A method for displaying temperature information of a high voltage battery system of an electrified vehicle, the method comprising:
  sensing, with a first temperature sensor disposed on a first battery module, a first temperature of the first battery module;
  sensing, with a second temperature sensor disposed on a second battery module, a second temperature of the second battery module;
  receiving, at a controller, the first and second temperatures;
  determining, at the controller, a temperature profile of the high voltage battery system based on the first and second temperatures;
  communicating, from the controller, to a human machine interface (HMI) the temperature profile; and
  displaying, at the HMI, the temperature profile including a temperature gradient and an efficiency factor of the high voltage battery system based on at least the first and second temperature sensors, wherein an efficiency factor less than 100% indicates that at least some of the one or more battery modules have a temperature that exceeds a threshold indicative of high temperature and negatively impacted performance.

8. The method of claim 7, wherein the temperature profile comprises a first area indicative of a high temperature.

9. The method of claim 8, wherein the temperature profile comprises a second area indicative of a first moderate temperature.

10. The method of claim 9, wherein the temperature information comprises a third area indicative of a second moderate temperature.

11. The method of claim 10, wherein the temperature information comprises a fourth area indicative of a low temperature.

* * * * *